United States Patent
Nakamura

(10) Patent No.: US 9,736,471 B2
(45) Date of Patent: Aug. 15, 2017

(54) CAPTURED IMAGE COMPRESSION TRANSMISSION METHOD AND CAPTURED IMAGE COMPRESSION TRANSMISSION SYSTEM

(75) Inventor: Yoichi Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 660 days.

(21) Appl. No.: 14/241,034

(22) PCT Filed: Aug. 22, 2012

(86) PCT No.: PCT/JP2012/071742
§ 371 (c)(1),
(2), (4) Date: Feb. 25, 2014

(87) PCT Pub. No.: WO2013/031785
PCT Pub. Date: Mar. 7, 2013

(65) Prior Publication Data
US 2014/0192879 A1    Jul. 10, 2014

(30) Foreign Application Priority Data

Sep. 1, 2011 (JP) .................................. 2011-190608

(51) Int. Cl.
*H04N 19/503* (2014.01)
*H04N 19/507* (2014.01)

(52) U.S. Cl.
CPC ..... *H04N 19/00575* (2013.01); *H04N 19/507* (2014.11)

(58) Field of Classification Search
CPC .............................................. H04N 19/00575
(Continued)

(56) References Cited

U.S. PATENT DOCUMENTS 6,014,694 A * 1/2000 Aharoni ......... H04N 21/234381
370/232
6,594,699 B1 * 7/2003 Sahai ................ H04L 29/06027
709/228
(Continued)

FOREIGN PATENT DOCUMENTS

CN    101193301 A    6/2008
JP    2006-115283    4/2006
(Continued)

OTHER PUBLICATIONS

Architectoral Considerations for Playback of quality Adaptive video over the internet; Reza R; 2000 IEEE.*
(Continued)

*Primary Examiner* — William C Vaughn, Jr.
*Assistant Examiner* — Luis Perez Fuentes
(74) *Attorney, Agent, or Firm* — Wilmer Cutler Pickering Hale and Dorr LLP

(57) ABSTRACT

Provided is a captured image compression transmission system comprising: a sending-side system which compresses an input image and sends the compressed image data; and a receiving-side system which restores the input image on the basis of the image data received from the sending-side system; wherein the sending-side system comprises: a sending-side storage unit which stores a plurality of reference images; a sending-side image selection unit which, in accordance with the degree of priority of information included in capturing information attached to an input image, selects reference images corresponding to the information in a stepwise manner from the sending-side storage unit, and thereby specifies one reference image; a differential image compression unit which acquires differential data between the reference image specified by the sending-side image selection unit and the input image, and compresses
(Continued)

the differential data; and a transmission unit which sends the compressed differential data to the receiving-side system.

8 Claims, 4 Drawing Sheets

(58) Field of Classification Search
 USPC .................................................. 375/240.15
 See application file for complete search history.

(56) References Cited

U.S. PATENT DOCUMENTS

| | | | |
|---|---|---|---|
| 6,789,123 B2 * | 9/2004 | Li | H04L 29/06027 |
| | | | 370/232 |
| 8,176,199 B2 * | 5/2012 | Yamane | H04L 12/56 |
| | | | 375/240 |
| 8,265,140 B2 * | 9/2012 | Mehrotra | H04N 19/147 |
| | | | 375/240.02 |
| 9,167,007 B2 * | 10/2015 | Sriram | H04N 21/23406 |
| 2002/0071052 A1 * | 6/2002 | Itoh | H04N 7/17318 |
| | | | 348/384.1 |
| 2011/0052045 A1 | 3/2011 | Kameyama | |

FOREIGN PATENT DOCUMENTS

| | | |
|---|---|---|
| JP | 2008-187306 | 8/2008 |
| JP | 2009-273116 | 11/2009 |
| WO | WO-2009/122760 | 8/2009 |

OTHER PUBLICATIONS

Intelligent streaming; XP-002177089.*
Architectural Considerations for Playback of Quality Adaptive Video over the Internet; Rejaie et al.*
Chinese Office Action issued by the State Intellectual Property Office of the People's Republic of China for Application No. 201280042793.2 dated Jun. 3, 2016 (19 pages).
International Search Report corresponding to PCT/JP2012/071742, dated Nov. 28, 2012; 1 page.

* cited by examiner

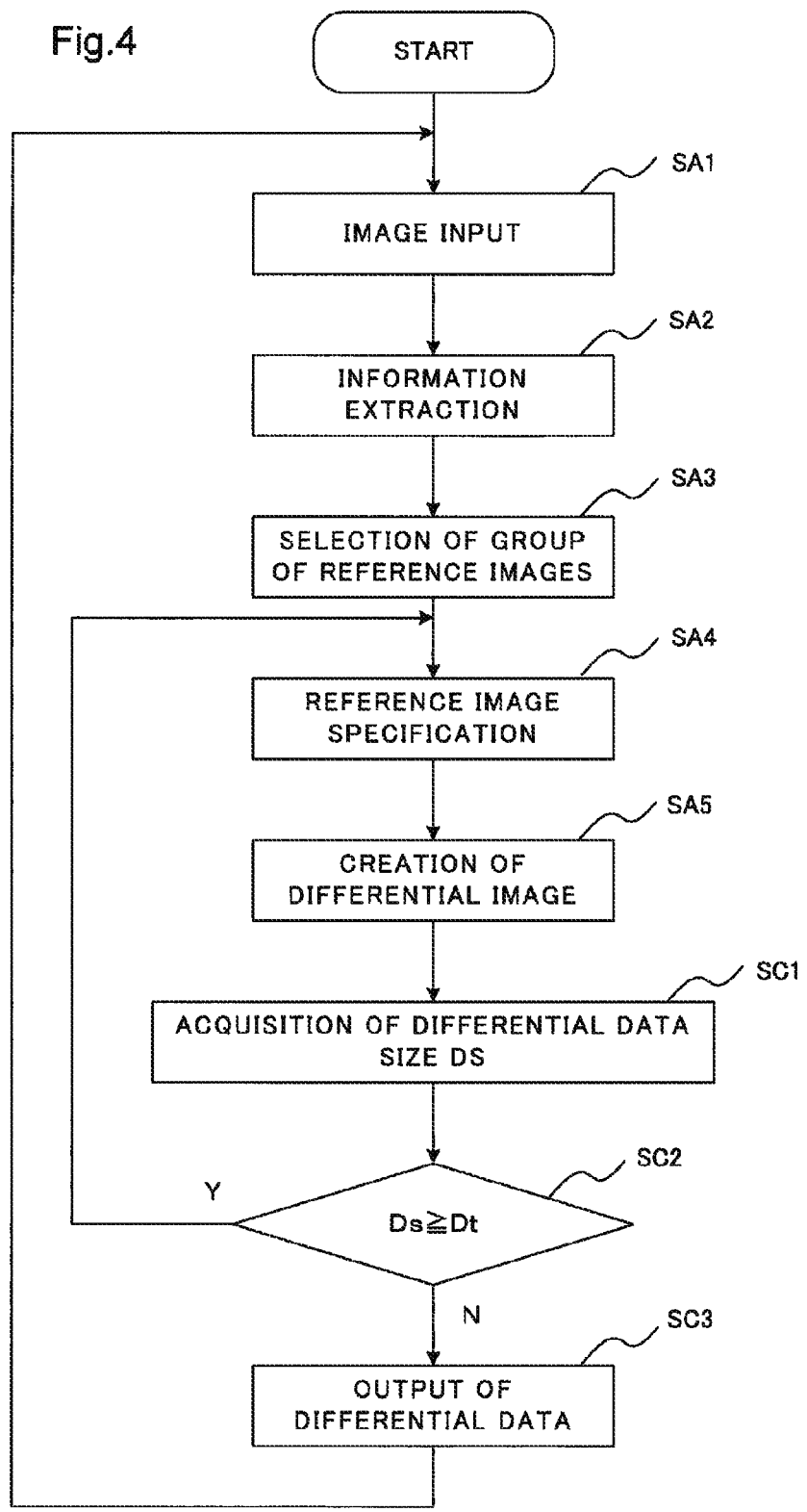

CAPTURED IMAGE COMPRESSION TRANSMISSION METHOD AND CAPTURED IMAGE COMPRESSION TRANSMISSION SYSTEM

CROSS-REFERENCE TO RELATED APPLICATIONS

This application is a national stage application of International Application No. PCT/JP2012/071742 entitled "Captured Image Compression and Transmission Method and Captured Image Compression and Transmission System," filed on Aug. 22, 2012, which claims the benefit of the priority of Japanese Patent Application No. 2011-190608, filed on Sep. 1, 2011, the disclosures of each of which are hereby incorporated by reference in their entirety.

TECHNICAL FIELD

The present invention relates to a captured image compression transmission method and a captured image compression transmission system, both for transmission of image data captured by a flying vehicle.

BACKGROUND ART

Today, it is popular to send image data captured by a flying vehicle, such as an aircraft and a satellite, to a ground station or the like, for the purpose of performing a process of analyzing the image data or the like on the ground.

When image capturing is continually performed in a flying vehicle, the size of captured image data becomes very large. Transmission of such image data is often performed by wireless. However, because the capacity of wireless transmission is finite, a long transmission time is necessary in a case of a large data size. In this respect, for the purpose of reducing a transmission time, such image data is generally transmitted in a compressed form.

For example, Japanese Patent Application Laid-Open No. 2006-115283 discloses a technology which compresses differential data between acquired image data and reference image data registered in advance, and transmits the compressed differential data.

(Patent Document 1)
Japanese Patent Application Laid-Open No. 2006-115283

DISCLOSURE OF INVENTION

Technical Problem

However, the reference image data according to Japanese Patent Application Laid-Open No. 2006-115283 cannot be said, in many cases, to correspond to various capturing conditions, and accordingly, there are problems in that reduction of the data size of compressed differential data is difficult and in that the restoration accuracy of an image restored on the basis of the differential data is low.

That is, because of difference in capturing conditions such as the amount of light and a shade, there occurs much difference between image data captured in the daytime and that at night even when both of them are image data of the same spot. However, in Japanese Patent Application Laid-Open No. 2006-115283, reference image data corresponding to various capturing conditions is not prepared, and accordingly the situation needs to be such that differential data is calculated using reference image data acquired in a capturing condition which is largely different from that in which image data of concern is captured.

As a result, the size of differential data between captured image data and reference image data greatly varies with capturing conditions, and accordingly, it becomes difficult to increase the compression rate (reduce the amount of transmission data), and hence the transmission time cannot be reduced. Additionally, when restoring the captured image, load of the restoration process becomes large because of the large differential data size. Accordingly, if the restoration process is performed in a short period of time, quality of the restoration is deteriorated.

In this respect, the main objective of the present invention is to provide a captured image compression transmission method and a captured image compression transmission system which can transmit an image in a form of differential data created with a high compression rate by selecting a reference image on the basis of information representing the capturing condition.

Solution to Problem

In order to solve the above-described problems, a captured image compression transmission system according to the present invention is characterized by that its sending-side system comprises: a sending-side storage unit which stores a plurality of reference images; a sending-side image selection unit which, in accordance with the degree of priority of information included in capturing information attached to an input image, selects reference images corresponding to the information in a stepwise manner from the sending-side storage unit, and thereby specifies one reference image; a differential image compression unit which acquires differential data between the reference image specified by the sending-side image selection unit and the input image, and compresses the differential data; and a transmission unit which sends the compressed differential data to a receiving-side system.

A captured image compression transmission method according to the present invention is characterized by that it comprises: a sending-side storage process which stores a plurality of reference images; a sending-side image selection process which, in accordance with the degree of priority of information included in capturing information attached to an input image, selects reference images corresponding to the capturing information in a stepwise manner from among the reference images stored in the sending-side storage process, and thereby specifies one reference image; a differential image compression process which acquires differential data between the reference image specified in the sending-side image selection process and the input image, and compresses the differential data; and a transmission process which sends the compressed differential data to a receiving-side system.

Advantageous Effects of Invention

According to the present invention, since differential data is created by specifying a reference image corresponding to a capturing condition in a stepwise manner, the amount of transmission data can be reduced even in a case of various capturing conditions.

BRIEF DESCRIPTION OF THE DRAWINGS

FIG. 4 is a flow chart showing a process for minimizing the size of difference data according to a second exemplary embodiment of the present invention.

DESCRIPTION OF EMBODIMENTS

First Exemplary Embodiment

Figure 1:
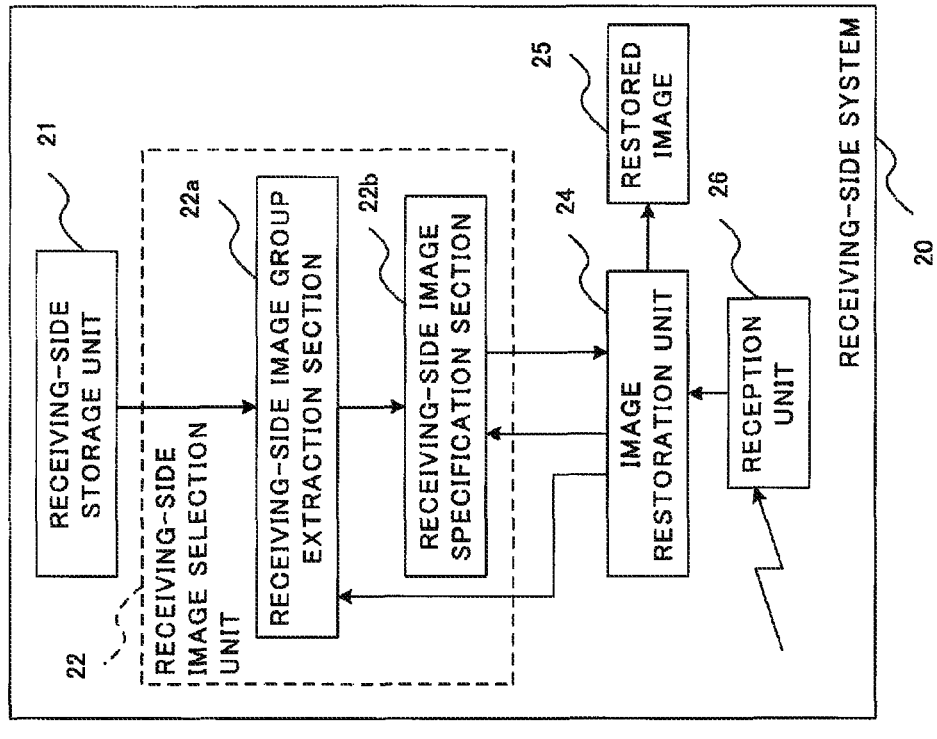
FIG. 1 is a block diagram of a captured image compression transmission system according to a first exemplary embodiment of the present invention.
Figure 1:
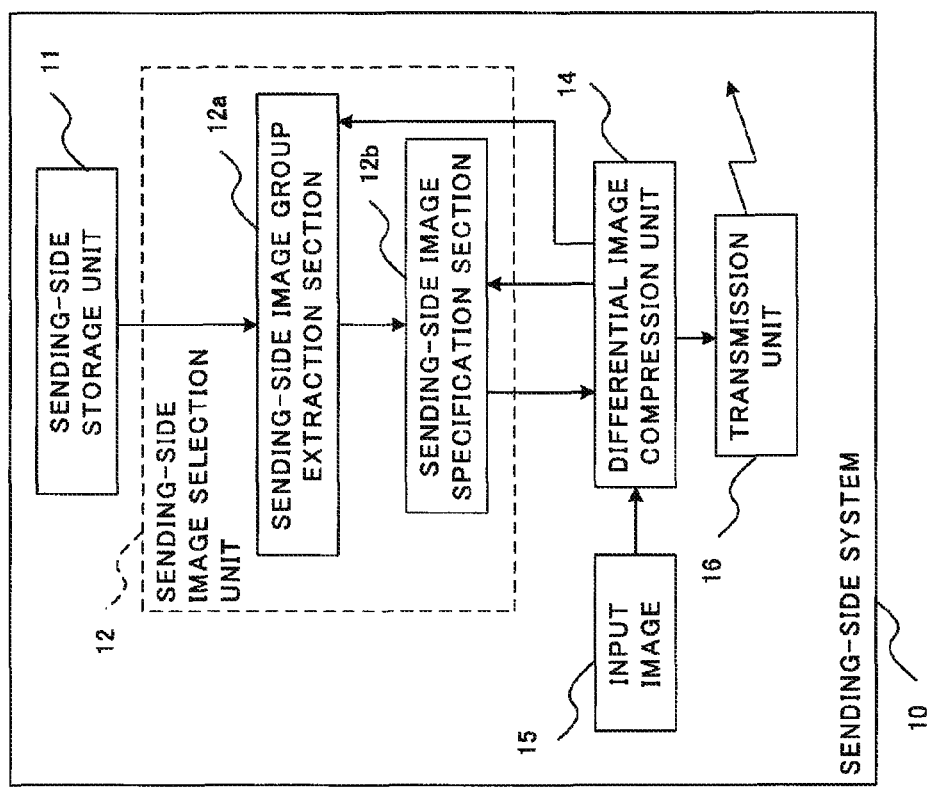

A first exemplary embodiment of the present invention will be described below. FIG. 1 is a block diagram of a captured image compression transmission system 2 according to the present exemplary embodiment. The captured image compression transmission system 2 is composed of a sending-side system 10 arranged at the sending side and a receiving-side system 20 arranged at the receiving side.

The sending-side system 10 comprises a sending-side storage unit 11, a sending-side image selection unit 12, a differential image compression unit 14 and a transmission unit 16. The sending-side image selection unit 12 includes a sending-side image group extraction section 12a and a sending-side image specification section 12b. The receiving-side system 20 comprises a receiving-side storage unit 21, a receiving-side image selection unit 22, an image restoration unit 24 and a reception unit 26. The receiving-side image selection unit 22 includes a receiving-side image group extraction section 22a and a receiving-side image specification section 22b.

An input image 15 is an image captured by a flying vehicle such as an aircraft and a satellite, and a restored image 25 is an image obtained by restoring the input image 15 at the receiving-side system 20.

When image capturing is performed by a flying vehicle, quality of a captured image greatly changes with capturing conditions such as the attitude and position of the vehicle body and the capturing time. Accordingly, analysis or the like of such image data is performed taking the capturing conditions into consideration. Information about such capturing conditions (hereafter, referred to as capturing information) is transmitted as telemetry data attached to the image data. Here, the telemetry data is information about the state of a flight vehicle such as an aircraft, a satellite and a rocket, which is transmitted via radio waves.

In the present invention, as will be described later, one reference image is selected and specified from among a plurality of reference images, and differential data between the specified reference image and a captured image is acquired. Here, each of the reference images is image data acquired and registered in advance, to which capturing information at the time of its capture is attached. As reference images for the same spot, a plurality of reference images with different capturing conditions are registered.

Then, specification of a reference image is performed on the basis of the degree of coincidence between capturing information included in the telemetry data and capturing information attached to each of the reference images. Also when decompression of received differential data is performed at the receiving-side system 20, specification of a reference image is performed on the basis of the degree of coincidence between capturing information included in the telemetry data and capturing information attached to each of the reference images. In this way, by utilizing already existing information (telemetry data or the like) instead of preparing special capturing information, the load of preparation and processing of the capturing information can be reduced.

Figure 2:
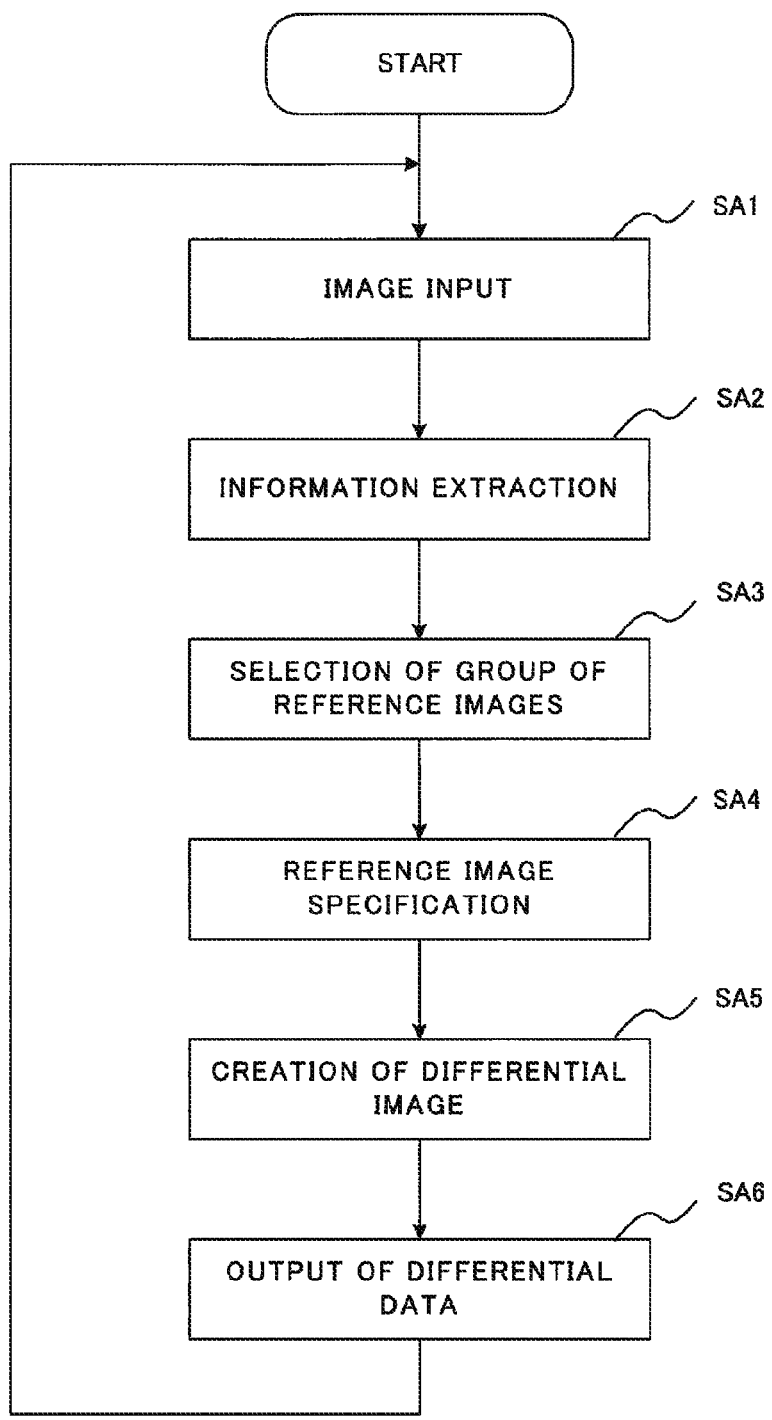
FIG. 2 is a flow chart showing a process of creating differential data at a sending-side system according to the first exemplary embodiment.
Figure 3:
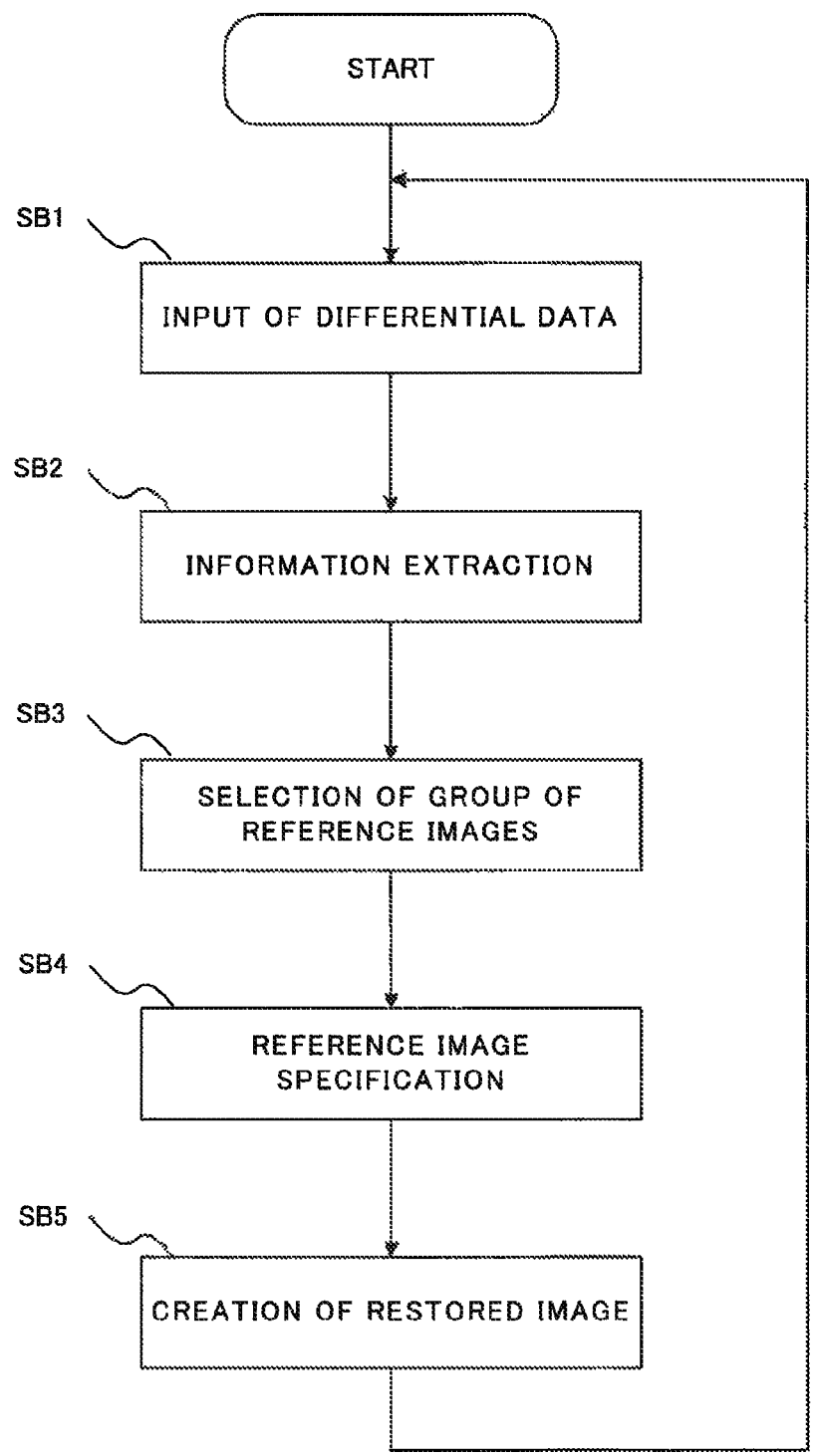
FIG. 3 is a flow chart showing a process of image restoration at a receiving-side system according to the first exemplary embodiment.

A description will be given of a detailed configuration of the captured image compression transmission system 2 thus configured, with reference to flow charts shown in FIGS. 2 and 3. FIG. 2 is a flow chart showing a process of differential data creation performed at the sending-side system 10, and FIG. 3 is a flow chart showing a process of image restoration at the receiving-side system 20. First, the differential data creation process at the sending-side system 10 shown in FIG. 2 will be described.

Step SA1: An image captured by a flying vehicle is inputted, with telemetry data attached to it, to the differential image compression unit 14 of the sending-side system 10, as an input image 15.

Step SA2: The differential image compression unit 14 temporarily stores the input image 15 into a storage unit not illustrated in the drawing, and extracts capturing information from the telemetry data attached to the input image 15. It is assumed that the capturing information includes capturing position information consisting of data on the position, attitude and the like of the flying vehicle having captured the image and capturing environment information consisting of data on the capturing time and the like.

From among the capturing information, the differential image compression unit 14 outputs the capturing position information to the sending-side image group extraction section 12a, and the capturing environment information to the sending-side image specification section 12b.

Step SA3: From among a plurality of reference images stored in advance in the sending-side storage unit 11, the sending-side image group extraction section 12a extracts all reference images which correspond to the capturing position information. Each of the reference images stored in advance in the sending-side storage unit 11 is image data acquired and registered in advance, to which capturing position information at the time of the acquisition is attached. Accordingly, when the sending-side image group extraction section 12a extracts reference images, the extraction is conducted in a manner to extract reference images whose attached information coincide with or approximate to the newly received capturing position information.

Here, as an example of a method of determining coincidence with or approximation to the newly received capturing position information, there may be mentioned a method of: regarding the position represented by the capturing position information attached to the captured image as a center; setting a certain radius (for example, 1 km) from the center position; and making the determination by whether or not the capturing position information attached to a reference image is within the area of the radius.

The number of thus extracted reference images may be more than one. That is, it may occur that a plurality of pieces of image data acquired by capturing the same spot in the past have been registered as reference images. Such reference images have the same capturing position information. It results in that the sending-side image group extraction section 12a extracts all reference images having the same capturing position information. Hereafter, a plurality of reference images extracted by the sending-side image group extraction section 12a are referred to as a group of reference images.

In the present exemplary embodiment, there is no restriction on who captures reference images. That is, image data captured by another flying vehicle also may be used as reference images.

Step SA4: From among the group of reference images, the sending-side image specification section 12b specifies a reference image which has capturing environment information coinciding with or approximating to the capturing environment information attached to the input image. The reference image thus specified is sent to the differential image compression unit 14. Hereafter, a reference image thus specified is referred to as a specific reference image.

As an example of a method of determining coincidence with or approximation to the newly received capturing environment information, there may be mentioned a method of, when the capturing environment information represents a time, setting a certain time slot around the time (for example, from one hour before the time until one hour after the time), and making the determination by whether or not the capturing environment information attached to a reference image represents a time within the time slot.

Step SA5: The differential image compression unit 14 extracts a difference between the specific reference image and the input image 15. Then, the differential image compression unit 14 performs an image compression process on the extracted differential image and thus creates differential data. At that time, the capturing information used for selecting and specifying the reference image is also attached to the differential data.

Here, as a method of the image compression process, the run length method, which is a compression method of reversible conversion enabling restoration of an image before compression from an image after the compression, or the like may be employed.

Further, by using the fact that an image which is a little different from a reference image (an image with a small amount of difference) has statistically a tendency to give small size differential data, it becomes possible, by changing the dynamic range to a small value, to reduce the size of differential data and improve the restoration accuracy of restored image data.

Step SA6: Then, the differential data is sent to the transmission unit 16 and is transmitted from the transmission unit 16 to the receiving-side system 20.

Next, the process of image restoration at the receiving-side system 20 shown in FIG. 3 will be described.

Step SB1: The reception unit 26 of the receiving-side system 20 receives differential data transmitted from the transmission unit 16 of the sending-side system 10, and sends it to the image restoration unit 24.

Step SB2: The image restoration unit 24 extracts capturing information included in the differential data. Then, the image restoration unit 24 outputs capturing position information included in the capturing information to the receiving-side image group extraction section 22a, and capturing environment information to the receiving-side image specification section 22b.

Step SB3: The receiving-side image group extraction section 22a selects reference images which coincide with or approximate to the received capturing position information, from the receiving-side storage unit 21. That is, a group of reference images is thus acquired.

Step SB4: From among the group of reference images selected by the receiving-side image group extraction section 22a, the receiving-side image specification section 22b specifies a reference image which corresponds to the capturing environment information, and outputs it to the image restoration unit 24. That is, a specific reference image is thus acquired.

These processes of extracting a group of reference images at the receiving-side image group extraction section 22a and of specifying a specific reference image at the receiving-side image specification section 22b are performed, similarly to those in the sending-side system 10, by determining whether or not the capturing information attached to a reference image coincides with or approximates to the capturing information attached to the received differential data.

Step SB5: The image restoration unit 24 restores an image using the received differential data and the specific reference image. A method used in the image restoration is one compatible with the compression method used for creating the differential data. For example, it is assumed that, in the differential image compression unit 14, differential data is created by performing a compression process of acquiring a differential image by subtracting pixel values of a specific reference image from pixel values of the input image 15 and subsequently applying the run length method. In that case, in the image restoration unit 24, the restored image 25 is created by performing a decompression process of the run length method on the differential data and subsequently acquiring the sum of the resulting data and a specific reference image.

Here, it is preferable that the sending-side system 10 and the receiving-side system 20 store the same reference images. In order to realize it, the captured image compression transmission system may be configured such that reference images are sent and received between the sending-side system 10 and the receiving-side system 20.

It may also be configured such that a newly acquired input image 15 is stored as a reference image into the sending-side storage unit 11, and a restored image 25 restored on the basis of the differential data with respect to the input data 15 is stored as a reference image into the receiving-side storage unit 21. By thus additionally registering a newly captured image as a reference image, the latest captured images can be used as reference images, and accordingly the data size of differential data can be reduced even when a capturing target changes with time (for example, when topography changes owing to wind and snow).

The process of additionally registering a newly captured image as a reference image may be an update process by overwriting. Here, the additional registration of a newly captured image is performed in a manner to widen the variation of reference images, as described below. If the difference between an existing reference image and a newly acquired captured image is small, setting of the newly captured image as a reference image cannot give any effect in reduction of a differential data size. For example, when the capturing environment information on a newly acquired captured image and that on an existing reference image are both information representing "cloudy weather", even if they have some difference in degree of "cloudy weather", they are regarded to have no significant difference because they both represent "cloudy weather". If even such a new captured image having no significant difference from an existing reference image is additionally registered, a large storage capacity is required. On the other hand, if the capturing environment information on an existing reference image represents "rainy weather", it is much different from that on the new captured image. In such a case, the new captured image is additionally registered in order to expand the variation of reference images.

Instead of additionally registering an image captured by an aircraft, a satellite and the like as a reference image on every image capturing, the additional registration of a captured image as a reference image may be performed only when the difference is large between the capturing information on the captured image and the capturing environment of an existing reference image to be compared. Such a way of additional registration, in which a captured image is registered as a reference image only when the capturing environment is much different from that of a reference image, has an advantage that the number of reference images can be increased while suppressing increase in the storage capacity required for storing reference images.

In that case, determination of whether or not to additionally register a captured image as a reference image may be made by either of the sending-side system 10 and the receiving-side system 20, and by sending the determination result to the other one of the systems, the same reference images may be registered at both of the sending-side system 10 and the receiving-side system 20.

Here, it is often the case that the amount of transmission from the receiving-side system 20 to the sending-side system 10 is smaller than that from the latter to the former. In such a case, it is preferable that the receiving-side system 20 makes the determination of whether or not to additionally register a reference image and sends the determination result to the sending-side system 10.

As an example of a cause of a great change in a captured image, there may be mentioned a weather condition at the capturing spot, such as being clear and rainy. For example, a certain spot may be captured at the same time of different days. In that case, if the weather condition is clear on one of the days and rainy on the other day, sunshine is different between the days, and accordingly the captured images are greatly different from each other.

Accordingly, if the weather condition is used as external information in selection and specification of a reference image, along with a capturing environment or by itself, the size of difference data can be reduced, and the restoration accuracy of a restored image can be improved. It is obvious that the present invention is not intended to limit external information to the weather condition. It is intended that external information is included in capturing information.

Although external information may be acquired at either of the sending-side system 10 and the receiving-side system 20, it is preferable from a viewpoint of transmission efficiency that external information is acquired at the sending-side system 10 and sent to the receiving-side system 20.

It has been already mentioned that capturing information includes capturing position information of a higher level and capturing environment information of a lower level. In the present description, this higher and lower relationship is referred to as degree of priority. It has been already described, accordingly, that the sending-side image group extraction section extracts a group of reference images using capturing position information with a higher degree of priority, and the sending-side image specification section specifies a specific reference image using capturing environment information with a lower degree of priority than that of the capturing position information. It is the same for the equivalent sections at the receiving side. By thus performing extraction and specification of a reference image in a stepwise manner, it becomes possible to acquire differential image with a small data size efficiently.

In this respect, the present invention is not intended to restrict constituent elements of the sending-side image selection unit to the sending-side image group selection section and the sending-side image specification section. Similarly, there is no such restriction on the receiving-side image selection unit. For example, when external information mentioned above is capturing information with a lower degree of priority than that of a capturing time, a configuration of the image selection units may be such that an image selection means of a lower level than that of the sending-side image specification section is provided, and accordingly the sending-side image specification section selects a plurality of specific reference images, and the image selection means selects a specific image from among the plurality of specific reference images on the basis of the external information. By employing that configuration, it becomes possible to select a more appropriate reference image and accordingly to create differential data with a smaller data size.

Although the above description has been given of a case where an image captured by a flight vehicle is transmitted to a receiving-side system such as a ground station, the configuration may also be such that an image captured on the ground is transmitted to a flying vehicle (sending-side system).

As has been described, according to the present invention, since one reference image is selected from among a plurality of reference images in a stepwise manner on the basis of capturing information and differential data is created with respect to the selected reference image, it becomes possible to reduce the data size of differential data and accordingly to perform efficient data transmission. Further, it also becomes possible to improve the restoration accuracy of a restored image.

Second Exemplary Embodiment

Next, a second exemplary embodiment of the present invention will be described. Here, for the same configuration as that in the first exemplary embodiment, the same sign is used and its description will be properly omitted.

In the first exemplary embodiment, a plurality of reference images corresponding to various kinds of capturing information are stored in advance. Then, one specific reference image is selected from among the plurality of reference images, and differential data is created with respect to it. In that case, determination of whether or not a selected specific reference image is the most appropriate image to minimize the size of differential data is not performed. In this respect, the present exemplary embodiment is configured such that whether the data size of created differential data is too large or not is determined so as to obtain differential data with the smallest size.

FIG. 4 is a flow chart showing a process performed in such a configuration. Here, steps SA1 to SA5 correspond to those in FIG. 2, and accordingly their descriptions will be omitted.

Step SC1: Acquired is the data size Ds of differential data created in the step SA5.

Step SC2: Determined is whether or not the acquired differential data size Ds is larger than a reference size value Dt set in advance. That is, if $Ds \geq Dt$, the specific reference image is determined to be inappropriate because the differential data size is larger than the reference size value Dt, and the process returns to the step SA4.

Because a group of reference images consisting of a plurality of reference images coinciding with or approximating to capturing position information has already been selected in the step SA3, the differential image compression unit 14 selects another reference image from among the group of reference images and creates differential data with respect to it. Repeating such a process, when the differential data size Ds has become smaller than the reference size value Dt, the process advances to a step SC3.

Here, capturing position information is information with a higher degree of priority (higher level information) than that of capturing environment information representing such as a capturing time and a weather condition. Therefore, the process of returning back to the step SA4 and thereby repeating the determination for specifying a reference image minimizing the differential data size from among a group of reference images having been selected on the basis of capturing position information can be said to be a process which makes it possible to efficiently perform selection of an optimum reference image.

Step SC3: The differential image compression unit 14 sends the differential data to the transmission unit 16, with capturing information used at the time of creating the differential data attached to it as telemetry data. Then, the transmission unit 16 sends the differential data to the receiving-side system 20.

According to the process shown in FIG. 3, the receiving-side system 20 extracts capturing information from the differential data, acquires a reference image on the basis of the capturing information, and then restores an image.

Because, as described above, selection of a reference image is redone depending on whether or not the size of differential data is larger than the predetermined value, the size of differential data becomes smaller, and its transmission comes to be completed in a shorter time. Further, because a smaller differential data size means a higher degree of similarity between a reference image and a captured image, accuracy of a restored image is improved.

Although, in the above description, the determination process of repeating selection of a reference image is performed at the sending-side system 10 in order to reduce the size of differential data, the determination process may be performed at the receiving-side system 20 and the result may be sent to the sending-side system 10. Although it is usual that the receiving-side system 20 and the sending-side system 10 perform two-way communication with each other, it is often the case that the transmission amount from the receiving-side system 20 to the sending-side system 10 is smaller than that from the latter to the former. Accordingly, in the case of sending a result of the determination process from the receiving-side system 20 to the sending-side system 10, the transmission can be performed in a shorter time. It is obvious that the receiving-side system 20 and the sending-side system 10 may be configured to perform the same determination process.

As has been described above, in the present exemplary embodiment, since an optimum reference image is specified from among a plurality of reference images and differential data is created with respect to it, improvement in the compression efficiency and reduction in the transmission time become possible, and the restoration accuracy of a restored image is also improved.

The features of the present invention described above are summarized below as supplementary notes.

[Supplementary Note 1]

A captured image compression transmission system comprising: a sending-side system which compresses an input image and sends the compressed image data; and a receiving-side system which restores the input image on the basis of the image data received from the sending-side system; wherein the sending-side system comprises:

a sending-side storage unit which stores a plurality of reference images;

a sending-side image selection unit which, in accordance with the degree of priority of information included in capturing information attached to an input image, selects reference images corresponding to the information in a stepwise manner from the sending-side storage unit, and thereby specifies one reference image;

a differential image compression unit which acquires differential data between the reference image specified by the sending-side image selection unit and the input image, and compresses the differential data; and a transmission unit which sends the compressed differential data to the receiving-side system.

[Supplementary Note 2]

The captured image compression transmission system according to supplementary note 1, wherein the receiving-side system comprises:

a reception unit which receives the compressed differential data from the sending-side system;

a receiving-side storage unit which stores a plurality of reference images;

a receiving-side image selection unit which, in accordance with the degree of priority of information included in capturing information attached to the differential data, selects reference images corresponding to the information in a stepwise manner from the receiving-side storage unit, and thereby specifies one reference image; and an image restoration unit which decompresses the differential data on the basis of the reference image specified by the receiving-side image selection unit.

[Supplementary Note 3]

The captured image compression transmission system according to supplementary note 2, wherein:

the capturing information includes capturing position information representing a capturing position and capturing environment information representing a capturing environment whose degree of priority is lower than that of the capturing position information; and the sending-side image selection unit and the receiving-side image selection unit comprise, respectively:

a sending-side image group selection section and a receiving-side image group selection section which each select a group of reference images corresponding to the capturing position information from, respectively, the sending-side storage unit and the receiving-side storage unit; and a sending-side image specification section and a receiving-side image specification section which each specify a reference image corresponding to the capturing environment information from among the group of reference images.

[Supplementary Note 4]

The captured image compression transmission system according to supplementary note 3, wherein, if the data size of created differential data is larger than a reference size value determined in advance, the differential image compression unit causes the sending-side image specification section to specify another reference image from among the group of reference images.

[Supplementary Note 5]

The captured image compression transmission system according to supplementary notes 3 or 4, wherein the transmission unit or the reception unit acquires external information complementing the capturing information from outside, and causes the sending-side image specification section or the receiving-side image specification section, respectively, to specify a reference image on the basis of the external information.

[Supplementary Note 6]

The captured image compression transmission system according to any one of supplementary notes 1 to 5, wherein the differential image compression unit or the image restoration unit updates the reference images stored in the sending-side storage unit or the receiving-side storage unit, respectively, with another input image.

[Supplementary Note 7]

A captured image compression transmission method used for a captured image compression transmission system comprising: a sending-side system which compresses an input image and sends the compressed image data; and a receiving-side system which restores the input image on the basis of the image data received from the sending-side system;

the captured image compression transmission method comprising:

a sending-side storage process which stores a plurality of reference images;

a sending-side image selection process which, in accordance with the degree of priority of information included in capturing information attached to an input image, selects reference images corresponding to the capturing information in a stepwise manner from among the reference images stored in the sending-side storage process, and thereby specifies one reference image;

a differential image compression process which acquires differential data between the reference image specified in the sending-side image selection process and the input image, and compresses the differential data; and a transmission process which sends the compressed differential data to the receiving-side system.

[Supplementary Note 8]

The captured image compression transmission method according to supplementary note 7 further comprising:

a reception process which receives the compressed differential data from the sending-side system;

a receiving-side storage process which stores a plurality of reference images;

a receiving-side image selection process which, in accordance with the degree of priority of information included in capturing information attached to the differential data, selects reference images corresponding to the information in a stepwise manner from among the reference images stored in the receiving-side storage process, and thereby specifies one reference image; and an image restoration process which decompresses the differential data on the basis of the reference image specified in the receiving-side image selection process.

[Supplementary Note 9]

The captured image compression transmission method according to supplementary note 8, wherein:

the capturing information includes capturing position information representing a capturing position and capturing environment information representing a capturing environment whose degree of priority is lower than that of the capturing position information; and the sending-side image selection process and the receiving-side image selection process comprise, respectively:

a sending-side image group selection process and a receiving-side image group selection process which each select a group of reference images corresponding to the capturing position information; and a sending-side image specification process and a receiving-side image specification process which each specify a reference image corresponding to the capturing environment information from among the group of reference images.

[Supplementary Note 10]

The captured image compression transmission method according to supplementary note 9, wherein the differential image compression process includes a process which, if the data size of created differential data is larger than a reference size value determined in advance, causes the sending-side image specification process to specify another reference image from among the group of reference images.

[Supplementary Note 11]

The captured image compression transmission method according to supplementary notes 9 or 10, wherein the transmission process or the reception process acquires external information complementing the capturing information from outside, and causes the sending-side image specification process or the receiving-side image specification process, respectively, to specify a reference image on the basis of the external information.

[Supplementary Note 12]

The captured image compression transmission method according to any one of supplementary note 7 to 11, wherein the differential image compression process or the image restoration process includes a process which updates the reference images stored in the sending-side storage process or the receiving-side storage process, respectively, with another input image.

Although the present invention has been described above with reference to the exemplary embodiments (and examples), the present invention is not limited to those exemplary embodiments (and examples) described above. In configurations and details of the present invention, various changes and modifications which are to be understood by those skilled in the art may be made within the scope of the present invention.

This application is based upon and claims the benefit of priority from Japanese Patent Application No. 2011-190608, filed on Sep. 1, 2011, the disclosure of which is incorporated herein in its entirety by reference.

REFERENCE SIGNS LIST 2 captured image compression transmission system
10 sending-side system
11 sending-side storage unit
12 sending-side image selection unit
12a sending-side image group extraction section
12b sending-side image specification section
14 differential image compression unit
15 input image
16 transmission unit
20 receiving-side system
21 receiving-side storage unit
22 receiving-side image selection unit
22a receiving-side image group extraction section
22b receiving-side image specification section
24 image restoration unit
25 restored image

The invention claimed is:

1. A captured image compression transmission system including a sending-side system which compresses an input image and sends the compressed image data and a receiving-side system which restores the input image on the basis of the image data received from the sending-side system;
   wherein the sending-side system comprises:
      a sending-side storage unit which stores a plurality of reference images of the sending-side;
      a sending-side image selection unit which selects reference images of the sending-side corresponding to capturing information in a stepwise manner from the sending-side storage unit in accordance with a degree of priority of the capturing information, where the capturing information is attached to an input image and includes capturing position information representing a capturing position and capturing environment information representing a capturing environment, where the capturing position information is given a higher level of priority and the capturing environment information is given a lower level of priority, and where the sending-side image selection unit further comprises:
         a sending-side image group selection section that selects a group of reference images corresponding to the capturing position information in the capturing information; and
         a sending-side image specification section that specifies a reference image corresponding to the capturing environment information in the capturing information from among the group of reference images;
      a differential image compression unit which acquires differential data between the reference image of the sending-side specified by the sending-side image selection unit and the input image, and compresses the differential data; and
      a transmission unit which sends the compressed differential data to the receiving-side system; and
   wherein the receiving-side system comprises:
      a reception unit which receives the compressed differential data from the sending-side system;
      a receiving-side storage unit which stores a plurality of reference images of the receiving-side that are independent of the plurality of reference images of the sending-side;
      a receiving-side image selection unit which selects reference images corresponding to the capturing information in a stepwise manner from the receiving-side storage unit in accordance with the degree of priority of the capturing information attached to the differential data, and thereby identifies one reference image of the receiving-side, wherein the receiving-side image selection unit further comprises:
         a receiving-side image group selection section which selects a group of reference images corresponding to the capturing position information from the receiving-side storage unit; and
         a receiving-side image specification section which specifies a reference image corresponding to the capturing environment information from among the group of reference images; and
      an image restoration unit which decompresses the differential data on the basis of the reference image of the receiving-side identified by the receiving-side selection unit.

2. The captured image compression transmission system according to claim 1, wherein,
   if the data size of created differential data is larger than a predefined data size value determined in advance, the differential image compression unit causes the sending-side image specification section to specify another reference.

3. The captured image compression transmission system according to claim 1, wherein
   the transmission unit or the reception unit acquires external information complementing the capturing information from outside, and causes the sending-side image specification section or the receiving-side image specification section, respectively, to specify a reference image on the basis of the external information.

4. The captured image compression transmission system according to claim 1, wherein
   the differential image compression unit or the image restoration unit updates the reference images stored in the sending-side storage unit or the receiving-side storage unit, respectively, with another input image.

5. A captured image compression transmission method used for a captured image compression transmission system including a sending-side system which compresses an input image and sends the compressed image data and a receiving-side system which restores the input image on the basis of the image data received from the sending-side system comprising:
   a sending-side storage process for storing a plurality of reference images of the sending-side;
   a sending-side image selection process for selecting reference images of the sending-side corresponding to capturing information in a stepwise manner from among the reference images stored in the sending-side storage process in accordance with a degree of priority of the capturing information, where the capturing information is attached to an input image and includes capturing position information representing a capturing position and capturing environment information representing a capturing environment, where the capturing position information is given a higher level of priority and the capturing environment information is given a lower level of priority and where the sending-side image selection process further comprises:
      a sending-side image group selection process that selects a group of reference images corresponding to the capturing position information in the capturing information; and
      a sending-side image specification process that specifies a reference image corresponding to the capturing environment information in the capturing information from among the group of reference images;
   a differential image compression process for acquiring differential data between the reference image of the sending-side specified in the sending-side image selection process and the input image, and compresses the differential data;
   a transmission process for sending the compressed differential data to the receiving-side system;
   a reception process which receives the compressed differential data from the sending-side system;
   a receiving-side storage process which stores a plurality of reference images of the receiving-side that are independent of the plurality of reference images of the sending-side;
   a receiving-side image selection process which selects reference images corresponding to the capturing information in a stepwise manner from the receiving-side storage process in accordance with the degree of priority of the capturing information attached to the differential data, and thereby identifies one reference image of the receiving-side, wherein the receiving-side image selection process further comprises:

a receiving-side image group selection process that selects a group of reference images corresponding to the capturing position information from the receiving-side storage unit; and a receiving-side image specification process that selects a reference image corresponding to the capturing environment information from among the group of reference images; and an image restoration process which decompresses the differential data on the basis of the reference image of the receiving-side identified by the receiving-side image selection process.

6. The captured image compression transmission method according to claim 5, wherein the differential image compression process includes a process which causes the sending-side image specification process to specify another reference image from among the group of reference images when the data size of created differential data is larger than a reference size value determined in advance.

7. The captured image compression transmission method according to claim 5, wherein the transmission process or the reception process acquires external information complementing the capturing information from outside, and causes the sending-side image specification process or the receiving-side image specification process, respectively, to specify a reference image on the basis of the external information.

8. The captured image compression transmission method according to claim 5, wherein the differential image compression process or the image restoration process includes a process which updates the reference images stored in the sending-side storage process or the receiving-side storage process, respectively, with another input image.

* * * * *